(12) United States Patent
Fujii

(10) Patent No.: US 8,355,155 B2
(45) Date of Patent: Jan. 15, 2013

(54) IMAGE FORMING APPARATUS WITH HIGH OPERABILITY

(75) Inventor: Masato Fujii, Nagaokakyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1899 days.

(21) Appl. No.: 11/452,327

(22) Filed: Jun. 14, 2006

(65) Prior Publication Data

US 2007/0211287 A1    Sep. 13, 2007

(30) Foreign Application Priority Data

Mar. 8, 2006  (JP) .................................. 2006-062999

(51) Int. Cl.
*G06K 15/00* (2006.01)
*G06F 3/12* (2006.01)

(52) U.S. Cl. ..................... 358/1.16; 358/1.15; 358/1.14; 358/444

(58) Field of Classification Search ........ 358/1.12–1.18; 705/28; 709/217
See application file for complete search history.

(56) References Cited

U.S. PATENT DOCUMENTS

| | | | |
|---|---|---|---|
| 6,297,865 B1 * | 10/2001 | Matsui et al. ................... | 349/123 |
| 6,476,933 B1 | 11/2002 | Honma | |
| 7,016,064 B2 * | 3/2006 | Iida et al. ...................... | 358/1.15 |
| 7,034,954 B1 * | 4/2006 | Utsunomiya ................ | 358/1.16 |
| 7,258,498 B2 * | 8/2007 | Hatta et al. ...................... | 400/62 |
| 7,557,950 B2 * | 7/2009 | Hatta et al. ...................... | 358/1.9 |
| 7,668,760 B2 * | 2/2010 | Suzuki et al. ................... | 705/28 |
| 7,796,282 B2 * | 9/2010 | Yamakawa .................... | 358/1.14 |
| 7,982,900 B2 * | 7/2011 | Miura et al. .................. | 358/1.16 |
| 2002/0060807 A1 | 5/2002 | Gassho et al. | |
| 2002/0095576 A1 * | 7/2002 | Stoltz et al. .................... | 713/175 |
| 2003/0154395 A1 * | 8/2003 | Miura et al. ................... | 713/200 |
| 2004/0046986 A1 * | 3/2004 | Kuwabara et al. ............. | 358/1.14 |
| 2004/0090647 A1 * | 5/2004 | Beard et al. ................... | 358/1.14 |
| 2004/0179230 A1 * | 9/2004 | Kitada et al. .................. | 358/1.15 |
| 2004/0243937 A1 * | 12/2004 | Gassho et al. ................. | 715/526 |
| 2005/0019077 A1 * | 1/2005 | Hatta et al. ....................... | 400/62 |
| 2006/0023247 A1 * | 2/2006 | Yamakawa .................... | 358/1.14 |
| 2006/0117092 A1 * | 6/2006 | Yanagi et al. .................. | 709/217 |

(Continued)

FOREIGN PATENT DOCUMENTS

JP         06-278324        10/1994

(Continued)

OTHER PUBLICATIONS

Notice of Grounds of Rejection in JP 2006-062999 dated Mar. 10, 2009, and an English Translation thereof.

(Continued)

*Primary Examiner* — Satwant Singh
(74) *Attorney, Agent, or Firm* — Buchanan Ingersoll & Rooney PC

(57) ABSTRACT

A job including image data to be subjected to printing is transmitted from a user PC to an image forming apparatus. Upon execution of printing in the image forming apparatus, the image forming apparatus notifies the user PC of completion of printing. The image forming apparatus also saves the job subjected to printing after assigning an ID for saving to the job. A screen appears on the user PC to give notification of completion, with a button for giving an instruction for re-outputting. The user PC gives an instruction to re-output the job by pressing the button, so that the image forming apparatus does reprinting.

20 Claims, 14 Drawing Sheets

U.S. PATENT DOCUMENTS

2006/0238808 A1* 10/2006 Sanchez .................. 358/1.16

FOREIGN PATENT DOCUMENTS

| | | |
|---|---|---|
| JP | 07-061061 | 3/1995 |
| JP | 11-261784 | 9/1999 |
| JP | 2000-207150 | 7/2000 |
| JP | 2002-157098 | 5/2002 |
| JP | 2002-236575 | 8/2002 |
| JP | 2003-033569 | 2/2003 |
| JP | 2003-323270 | 11/2003 |
| JP | 2004-005557 | 1/2004 |

OTHER PUBLICATIONS

Final Decision for Rejection in JP 2006-062999 dated Jun. 2, 2009, and an English Translation thereof.

Questioning mailed Feb. 22, 2011 in Japanese Patent Application No. 2006-062999 and English translation thereof.

* cited by examiner

FIG.17

ENTER LOG-IN USER NAME AND PASSWORD

USER NAME [　　　　　　　　] [LIST]

PASSWORD [　　　　　　　　]

FIG.18

REPROCESSED JOB

| BASIC SETTINGS | N-in-one /ORIGINAL | IMAGE QUALITY /DENSITY | ADVANCED SETTINGS |

COLOR — AUTO COLOR
PAPER — AUTO
MAGNIFICATION — × 1.000
SINGLE-SIDED/DOUBLE-SIDED — SINGLE-SIDED >DOUBLE-SIDED

CONTINUOUS READING SETTING | SADDLE-STITCH | FINISH | IMAGE

FIG.19

| No. | REGISTERER | STATUS | DOCUMENT NAME | REGISTRATION TIME | ORIGINAL | NUMBER OF COPIES |
|---|---|---|---|---|---|---|
| 15 | PC-A | HOLDING | TEST.txt | 18:03 | 1 | 1 |

REPROCESSED JOBS LIST

IMAGE FORMING APPARATUS WITH HIGH OPERABILITY

This application is based on Japanese Patent Application No. 2006-062999 filed with the Japan Patent Office on Mar. 8, 2006, the entire content of which is hereby incorporated by reference.

BACKGROUND OF THE INVENTION

1. Field of the Invention

The present invention relates to an image forming apparatus, an information processing apparatus, an image processing program product, and an image processing method, and more particularly to an image forming apparatus, an information processing apparatus, an image processing program product, and an image processing method with high operability for re-outputting.

2. Description of the Related Art

When an image forming apparatus such as a printer is used in an environment connected to a network, an application to operate the image forming apparatus is started in an information processing apparatus connected to the image forming apparatus. Then, for example, after printing is done in the image forming apparatus and the application is ended, if an additional operation becomes necessary in connection with the printing such as additional printing or changing print settings, the application needs to be opened again to perform the operation.

Japanese Laid-Open Patent Publication No. 2002-236575 (referred to as Patent Document 1) proposes an image recording apparatus as follows. When an additional operation becomes necessary before printing (that is, when the job is in the queuing state) or during printing, the image recording apparatus stops a printing operation by a prescribed operation, changes the conditions by an operation in itself, and does the printing from the beginning under the changed conditions.

Patent Document 1 also proposes a method of changing conditions after printing, in which a job is printed and simultaneously saved in a dedicated memory region that is a so-called box, so that the corresponding job is selected and printed again with changed conditions by opening the box later.

However, the operation of opening an application again to perform an operation after an operation was once performed on an image forming apparatus is cumbersome and inconvenient for the user.

Moreover, in the image recording apparatus proposed in Patent Document 1, although the conditions can be changed before or during printing, additional printing or changing print settings generally becomes necessary after the printed material is examined. Unfortunately, the settings cannot be changed after completion of the printing.

In addition, even when a job is printed and simultaneously saved in the aforementioned box, an operation for opening a box is necessary to perform an additional operation after printing, which is cumbersome and inconvenient for the user.

SUMMARY OF THE INVENTION

The present invention is made to solve the problems described above. It is an object of the present invention to provide an image forming apparatus capable of performing an additional operation in an easy operation when the additional operation on image data becomes necessary after an operation is performed on the image forming apparatus, an information processing apparatus, an image forming program product, and an image processing method.

In order to achieve the aforementioned object, in accordance with an aspect of the present invention, an image forming apparatus includes: an output unit outputting first image data according to a first job; a holding unit holding the first image data even after completion of the first job; and a transmission unit transmitting data giving notification of completion of the first job and data for giving an instruction to re-output the first image data to an information processing apparatus, upon completion of an output according to the first job.

In accordance with another aspect of the present invention, an image forming apparatus includes: an output unit outputting first image data received from an information processing apparatus according to a first job; a transmission unit, upon completion of an output according to the first job, giving notification of completion of the output; a holding unit holding the first image data; a display unit displaying a screen for giving an instruction to re-output the first image data held in the holding unit; and an operation unit giving an instruction to re-output the first image data.

In accordance with a further aspect of the present invention, an information processing apparatus includes: a reception unit receiving, from an image forming apparatus that has output image data according to a job, data giving notification of completion of the job and data for giving an instruction to re-output the image data; a display unit displaying the data received by the reception unit on a screen; and an instruction unit instructing the image forming apparatus to re-output the image data according to the screen.

In accordance with yet another aspect of the present invention, an image processing program product causes a computer to perform image processing including the steps of outputting image data according to a job; performing a process for holding the image data even after completion of the job; upon completion of an output according to the job, transmitting data giving notification of completion of the job and data for giving an instruction to re-output the image data to an information processing apparatus; inputting an instruction to re-output the image data; and upon an input of the instruction to re-output the image data, re-outputting the held image data.

In accordance with a still further aspect of the present invention, an image processing method includes the steps of: outputting image data according to a job in an image forming apparatus; upon completion of an output according to the job, transmitting data giving notification of completion of the job and data for giving an instruction to re-output the image data to an information processing apparatus that has given an instruction to output the image data from the image forming apparatus; storing the image data in a holding unit even after completion of the job in the image forming apparatus; giving an instruction from the information processing apparatus to the image forming apparatus to re-output the image data, according to a screen displaying data giving notification of completion of the job and data for giving an instruction to re-output the image data; and re-outputting the image data according to the instruction in the image forming apparatus.

Because of the aforementioned configuration of the image forming apparatus in accordance with the present invention, output processing is performed on image data according to a job, and after completion of the job, an instruction to reprocess the image data can be given with an easy operation in the image forming apparatus or an information processing apparatus connected thereto.

In addition, because of the aforementioned configuration of the information processing apparatus in accordance with the present invention, after notification of completion of outputting image data from an image forming apparatus connected thereto, an instruction to reprocess the image data can be given with an easy operation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing an illustrative example of a hardware configuration of a user PC 5 realized by a general personal computer or the like.

FIG. 17 shows an illustrative example of a log-in screen.

FIG. 18 shows an illustrative example of a basic screen.

FIG. 19 shows an illustrative example of a screen in which a job list is displayed.

DESCRIPTION OF THE PREFERRED EMBODIMENTS

Figure 1:
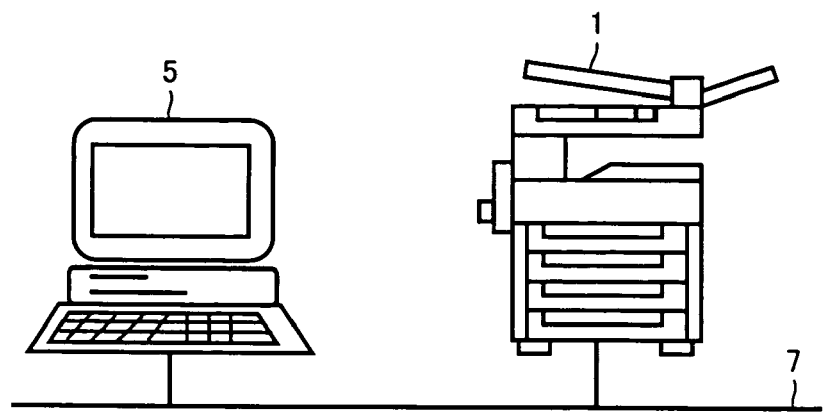
FIG. 1 shows an illustrative example of a configuration of an image forming system.

In the following, the embodiments of the present invention will be described with reference to the figures. In the following description, the same parts and components will be denoted with the same reference characters. The designations and functions are also the same.

Referring to FIG. 1, an image forming system in accordance with the present embodiment is configured to include an image forming apparatus 1 and a user personal computer (abbreviated as PC hereinafter) 5. These devices are connected to each other via a wired or wireless network 7.

A copier, printer, or MFP (Multi Function Peripheral) that is a combination thereof is applicable as image forming apparatus 1. In the present embodiment, image forming apparatus 1 is MFP.

Figure 2:
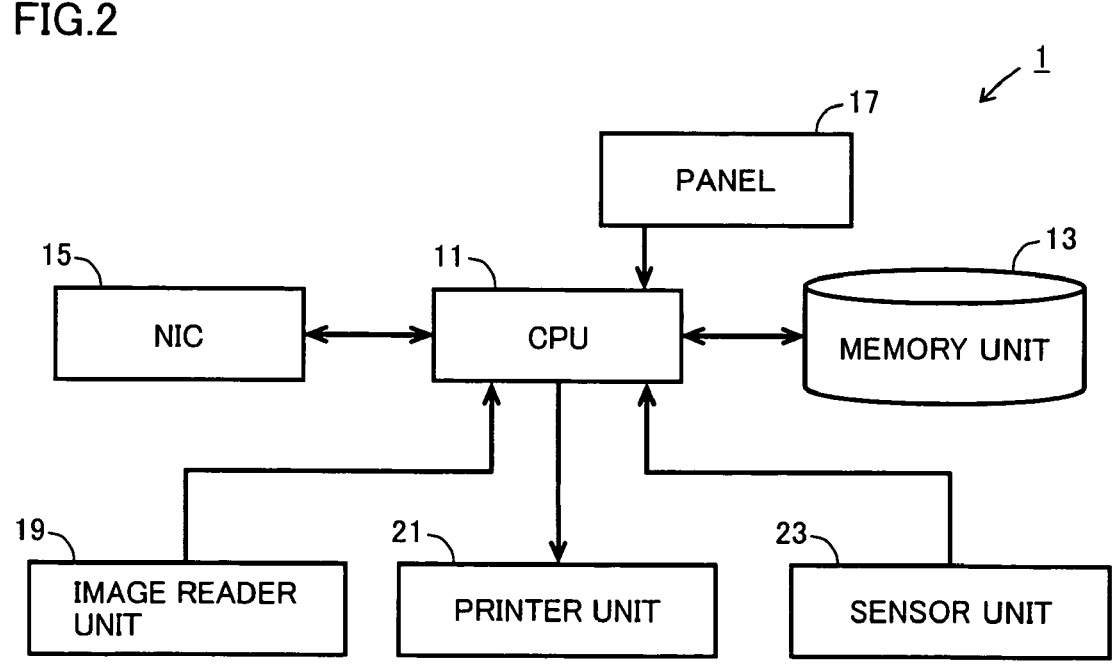
FIG. 2 is a block diagram showing an illustrative example of a hardware configuration of an image forming apparatus 1 that is MFP (Multi Function Peripheral).

Referring to FIG. 2, image forming apparatus 1 is configured to include a CPU (Central Processing Unit) 11 controlling the entire apparatus, an image reader unit 19 reading image data from an original, a printer unit 21 printing an image on a sheet, an NIC (Network Interface Card) 15 that is an expansion card inserted in a not-shown expansion slot for connecting image forming apparatus 1 to network 7 or a telephone line or for short-range wireless communications, a memory unit 13 formed of HD (Hard Disk), RAM (Random Access Memory), or the like to store a job, a program executed in CPU 11, and the like, a panel 17 that is an interface with the user, and a sensor unit 23 detecting the remaining amount of consumables and the like.

Figure 3:
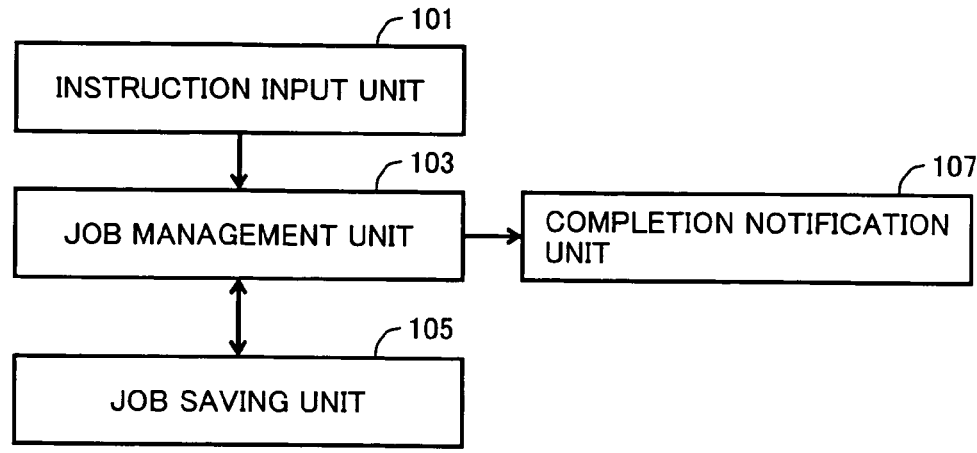
FIG. 3 is a block diagram showing an illustrative example of a functional configuration for performing a re-operation process in image forming apparatus 1.

The function for performing a re-operation process in image forming apparatus 1 having a configuration shown in FIG. 3 is mainly formed in CPU 11 by CPU 11 executing the program stored in memory unit 13 and may partially be formed by any other hardware configuration shown in FIG. 2.

Referring to FIG. 3, the function for performing a re-operation process in image forming apparatus 1 is configured to include an instruction input unit 101 inputting an instruction from a user, a job management unit 103 managing a job in image forming apparatus 1, a job saving unit 105 saving a job, and a completion notification unit 107 giving notification of completion of execution of a job.

Instruction input unit 101 receives an instruction transmitted from user PC 5 via network 7 or an instruction by operating panel 17 and inputs the same to job management unit 103.

Job management unit 103 manages a job to be subjected to printing in printer unit 21 or a transmission of image data through NIC 15. Specifically, job management unit 103 assigns an ID for saving for specifying a job and saves the ID for a certain period of time in job saving unit 105. In addition, in response to completion of an operation in a function corresponding to a job, job management unit 103 gives notification of completion of the job to completion notification unit 107 and also gives notification of the ID. Furthermore, in response to an instruction input from instruction input unit 101, job management unit 103 retrieves the corresponding job from job saving unit 105, outputs the job to the function corresponding to the instruction, such as printer unit 21. In addition, the retrieved job is processed as necessary.

Job saving unit 105 corresponds to a prescribed region in memory unit 13. Alternatively, it may be configured to include a server (not shown) or the like included in the image forming system. Preferably, job saving unit 105 is a volatile storage region (memory) such as RAM. Since job saving unit 105 is a volatile storage region, the saved job is discarded when an apparatus (image forming apparatus 1 or the like) including the storage region is powered off Therefore, the confidentiality of a job is improved. Furthermore, the storage region corresponding to job saving unit 105 is preferably a region that can be accessed by a prescribed operation, a prescribed authorized user, or a prescribed operation by a prescribed user. Job saving unit 105 is a region to which access is limited, which also improves the confidentiality of a job.

Completion notification unit 107 receives a notification from job management unit 103 to notify user PC 5 that has given an instruction for the job, a device designated beforehand, or the like, of the ID together with completion of a printing operation in printer unit 21, and the like. Instruction input unit 101 described above receives an instruction according to this notification.

User PC 5 corresponds to a personal computer or the like.

Figure 4:
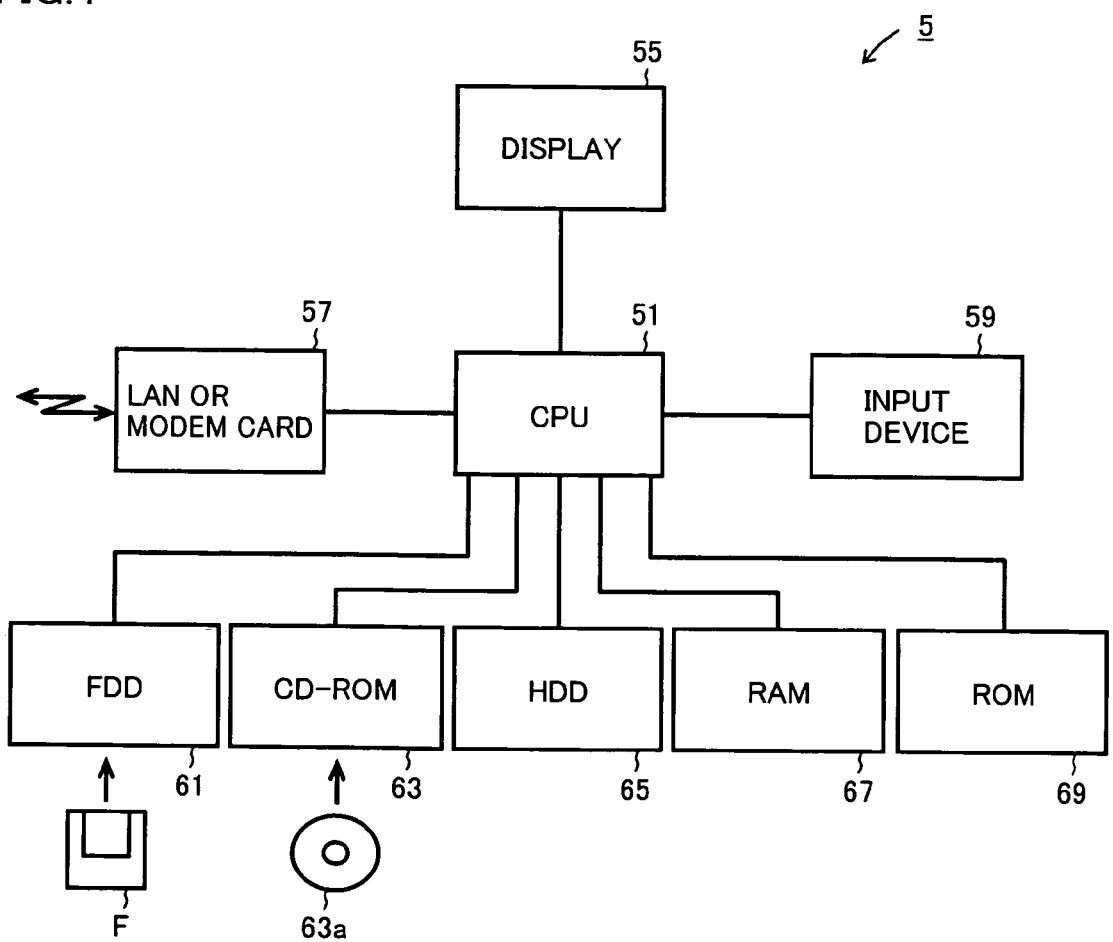

Referring to FIG. 4, user PC 5 is configured to include a CPU 51 controlling the entire device, a display 55, an LAN card 57 (or modem card) for connection to network 7 or external communications, an input device 59 formed of a keyboard or a mouse, a flexible disk drive (FDD) 61, a CD-ROM (Compact Disk-Read Only Memory) drive 63, a hard disk drive 65, an RAM 67, and an ROM 69.

Flexible disk drive 61 allows data such as a program recorded on a flexible disk F to be read. CD-ROM drive 63 allows data such as a program recorded on a CD-ROM 613*a* to be read.

Figure 5:
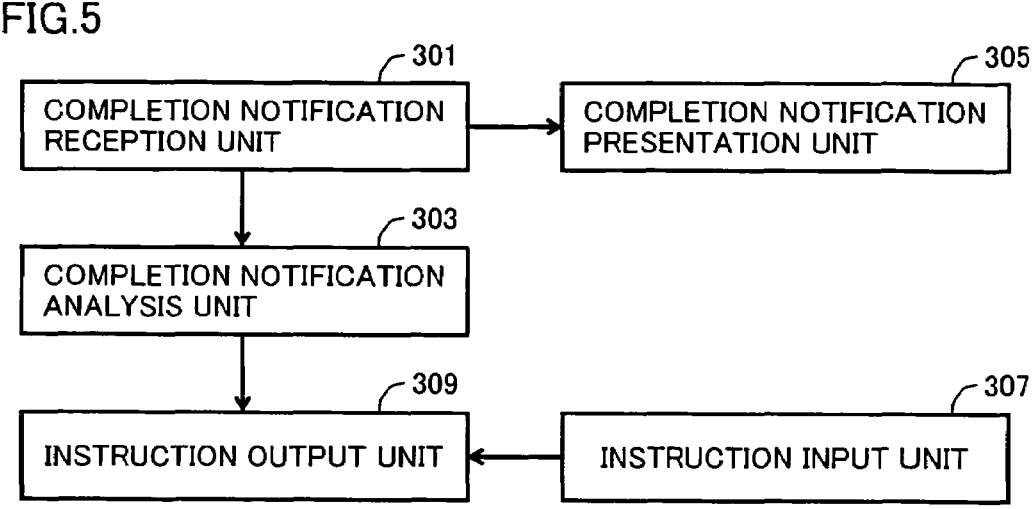
FIG. 5 is a block diagram showing an illustrative example of a functional configuration for performing a re-operation process in user PC 5.

The function of user PC 5 having a configuration shown in FIG. 5 is mainly formed in CPU 51 by CPU 51 executing the program stored in ROM 69 or the like and may partially be formed by any other hardware structure shown in FIG. 4.

Referring to FIG. 5, the function for performing a re-operation process in user PC 5 is configured to include a completion notification reception unit 301 receiving the notification of completion of a job as described above from image forming apparatus 1, a completion notification presentation unit 305 presenting a notification to the user, a completion notification analysis unit 303 analyzing the received notification, an instruction input unit 307 inputting an instruction from the user, and an instruction output unit 309 outputting an instruction to image forming apparatus 1.

Completion notification reception unit 301 receives the notification of completion of a job as described above output from completion notification unit 107 of image forming apparatus 1 via network 7 and inputs the same to completion notification analysis unit 303 and completion notification presentation unit 305. Completion notification analysis unit 303 analyzes the notification to obtain therefrom an ID for specifying a target job in image forming apparatus 1 and input the ID to instruction output unit 309.

Completion notification presentation unit 305 performs a process for presenting the notification to the user, including a process for displaying the notification on display 55 for presentation to the user or a process for presenting the notification in the form of a sound using a (not shown) sound output device.

Instruction input unit 307 receives an instruction given by operating input device 59 based on the above-noted presentation and inputs the same to instruction output unit 309.

Instruction output unit 309 instructs image forming apparatus 1 to reprocess the job based on the instruction input from instruction input unit 307 and the ID of the job input from completion notification analysis unit 303.

Figure 6:
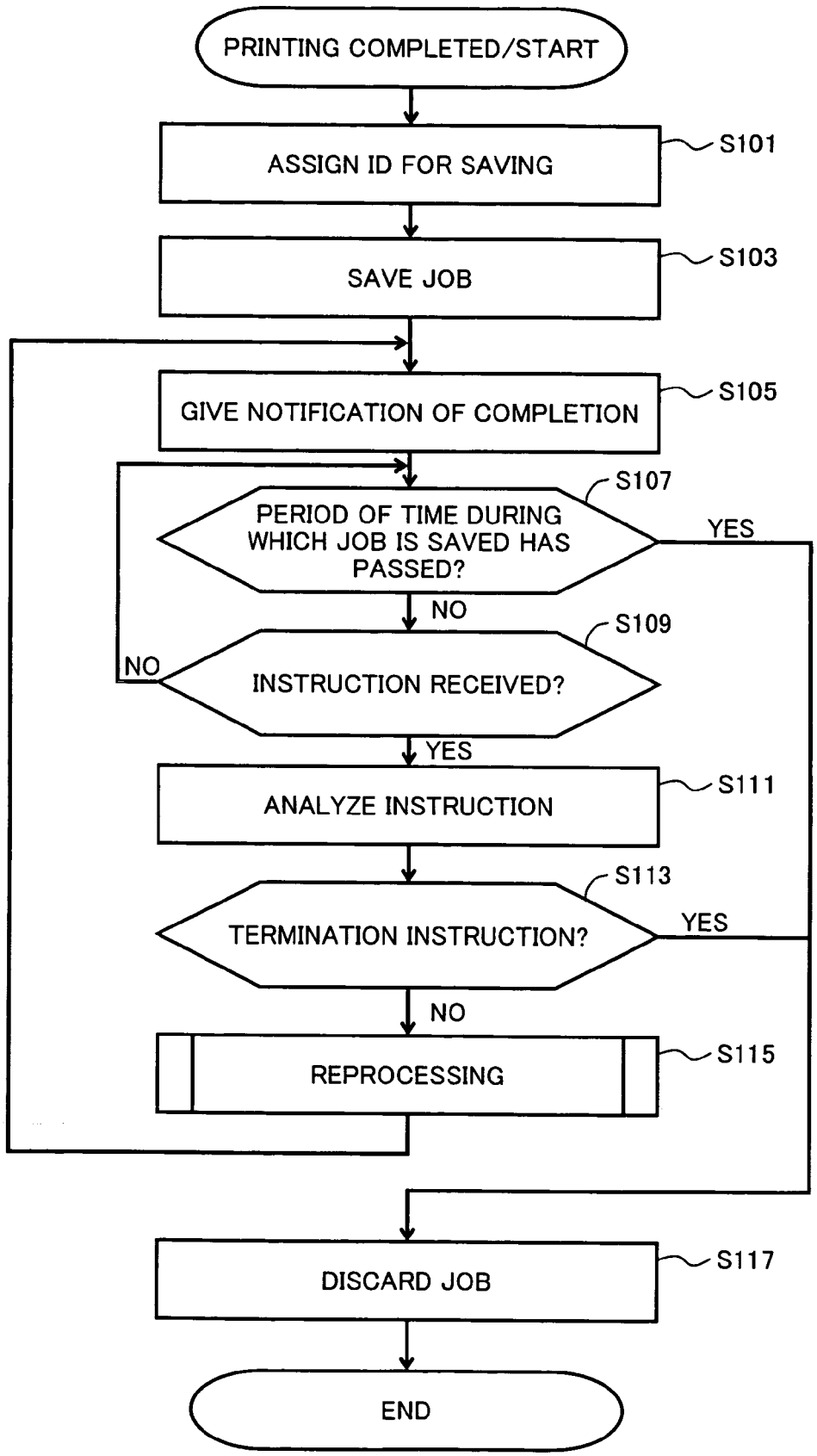
FIG. 6 is a flowchart illustrating a re-operation process performed in image forming apparatus 1.

The process illustrated in the flowchart in FIG. 6 is started when a printing job sent from user PC 5 is executed in image forming apparatus 1 and then an operation of outputting image data included in the job (the execution of the job) is completed. This process is realized by CPU 11 of image forming apparatus 1 reading and executing the program stored in memory unit 13. Here, "completion of a job" refers to the state in which execution of a job sent from user PC 5 is completely ended. It is noted that the kinds of operation of outputting image data includes printing, facsimile transmission, mail transmission or saving (saved in HD that is a nonvolatile memory of its own or HD of any other device), and the like. Here, the following description will be made taking printing as an example. The other operations such as facsimile transmission may be performed similarly.

Referring to FIG. 6, first, job management unit 103 assigns an ID for saving for specifying a job in image forming apparatus 1 to the job subjected to a printing operation, that is, the job of which execution has been completed (step S101). The job having the ID assigned at step S101 includes printed image data and job conditions such as printing conditions. Job management unit 103 saves this job in job saving unit 105 (step S103). It is noted that although ID is assigned at step S101 as described above after completion of the printing operation in the present embodiment, the printing operation may be completed after ID is assigned at the above-noted step S101 or after it is saved at the above-noted step S103.

Figure 9:
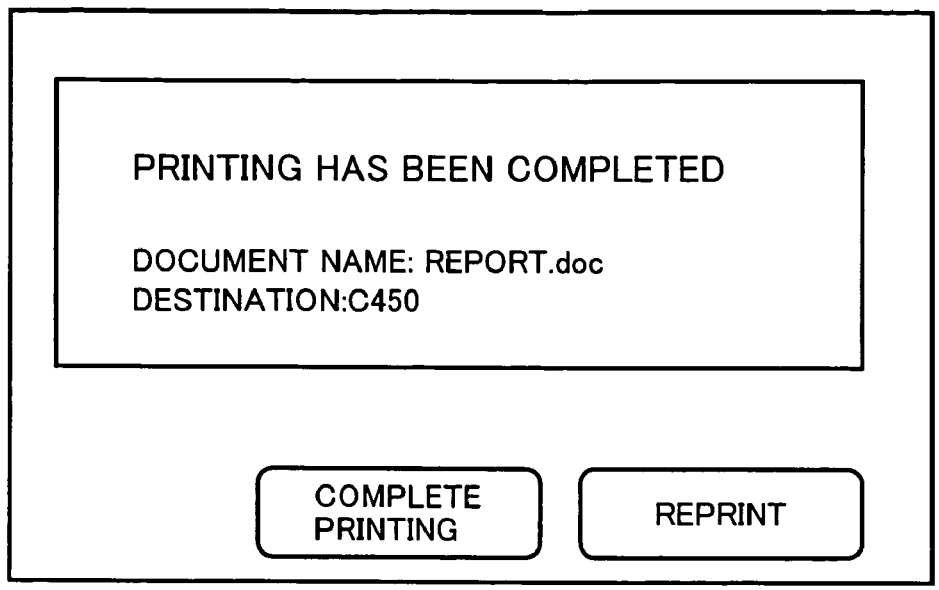
FIG. 9 shows an illustrative example of a screen giving notification of printing completion.

Then, completion notification unit 107 notifies user PC 5 of completion of printing together with the ID for saving of the job (step S105). Here, the notification of completion of printing refers to information (data) for informing the user that the execution of a job has been completed. Specifically, in addition to the information indicating that the execution of a job has been completed, the notification includes, as shown in FIG. 9 illustrated later, information about a document name of image data, identification information of image forming apparatus 1 itself, or information about a device name, or the like. Such information is transmitted to user PC 5. It is noted that information of time at which printing has been completed or the like may additionally be transmitted to user PC 5, as a matter of course. Now, together with the notification of completion, means for giving an instruction for reprocessing on the job is presented to user PC 5. A button for giving an instruction for reprocessing will be illustrated later as the means for giving an instruction for reprocessing. However, the present invention is not limited to the button and may include a screen showing an operation method for giving an instruction for reprocessing, a screen showing an operation method for displaying a screen for giving an instruction for reprocessing, and others. Alternatively, information (command or the like) allowing a screen or a button to appear on user PC 5 may be transmitted to user PC 5, as a matter of course, rather than presenting (transmitting) information of a screen or button itself to user PC 5.

It is noted that although, here, the recipient of notification is user PC 5 that has transmitted the job, the recipient may be set beforehand, instead. If the correspondence between the job and the recipient is stored in memory unit 13, at step S105, the recipient based on the correspondence may be specified and given notification.

Then, transmission of an instruction from user PC 5 is awaited in response to the notification of completion of printing. When instruction input unit 101 receives the instruction (YES at step S109), job management unit 103 analyzes the contents thereof (step S111). As a result, if the received instruction is an instruction to terminate an operation on the job (YES at step S113), job management unit 103 retrieves the job specified the ID included in the instruction from user PC 5 from job saving unit 105 and then discards the job (step S117), and a sequence of processes will end.

If the instruction from user PC 5 is not a termination instruction (NO at step S113), job management unit 103 retrieves the job specified the ID included in the instruction from user PC 5 from job saving unit 105 and then performs reprocessing according to the instruction (step S115). Upon completion of the processing, completion notification unit 107 similarly notifies user PC 5 of completion and thereafter awaits an instruction (step S105). It is noted that the instruction from user PC 5 is not a termination instruction, job management unit 103 may assign a new ID to the job reprocessed according to the instruction at step S115 as described above and save the ID together with the content of the instruction while discarding the ID assigned to the original job at the above-noted step S101 and the job saved at the above-noted step S103. Alternatively, the already-assigned ID or saved job may be used as they are, or may be used by changing a corresponding part if there is any change.

When a prescribed period of time during which a job is saved in job saving unit 105 has passed while an instruction from user PC 5 is awaited (YES at step S107), job management unit 103 retrieves the corresponding job from job saving unit 105 and discards the job (step S117), and a series of processes will end.

The period of time during which a job is saved as described above may be set by the user who gives an initial printing instruction for the job. Alternatively, it may be set beforehand or may be set or changed by a specific user such as the administrator of the image forming system.

It is noted that another job may be processed while the process as described above is performed in image forming apparatus 1, that is, while the job of which execution has been completed is saved in job saving unit 105. More specifically, assuming that the job of which execution has been completed is a first job and another job is a second job, the second job can be processed while the process as described above is performed on the first job upon completion of execution of the first job and the first job is saved in job saving unit 105. In other words, the process as described above in relation with the first job may be performed in parallel with another process in relation with the second job in CPU 11.

Furthermore, the first job subjected to the reprocessing at the above-noted step S115 may be submitted following the second job presently under execution, or may be executed by generating an interrupt in the second job under execution. Alternatively, if, in addition to the second job presently under execution, a third job and a fourth job are waiting, the first job may be submitted at the end of the waiting third and fourth jobs (queue). Alternatively, if a priority is automatically allocated to each job (the first to fourth jobs) according to the attribute such as the content of the job or the executor, the first job may automatically be submitted at a position according to the priority allocated to each job for the waiting second to fourth jobs. Furthermore, the position at which the first job is submitted, that is, the timing at which the first job is executed again (re-output) may be set by the user who is the executor of the first job or may be set by a specific user such as the administrator of the image forming system. Whether or not the user is authorized to make the setting is determined by comparing log-in information with information of the authorized user registered beforehand for verification. It is noted that the instruction about the timing at which the first job is executed again (re-output) may be given by designating the position at which the job is submitted as described above or by designating the time for execution. The instruction about the timing of the first job subjected to reprocessing as described above is similar in each of the following embodiments.

Figure 7:
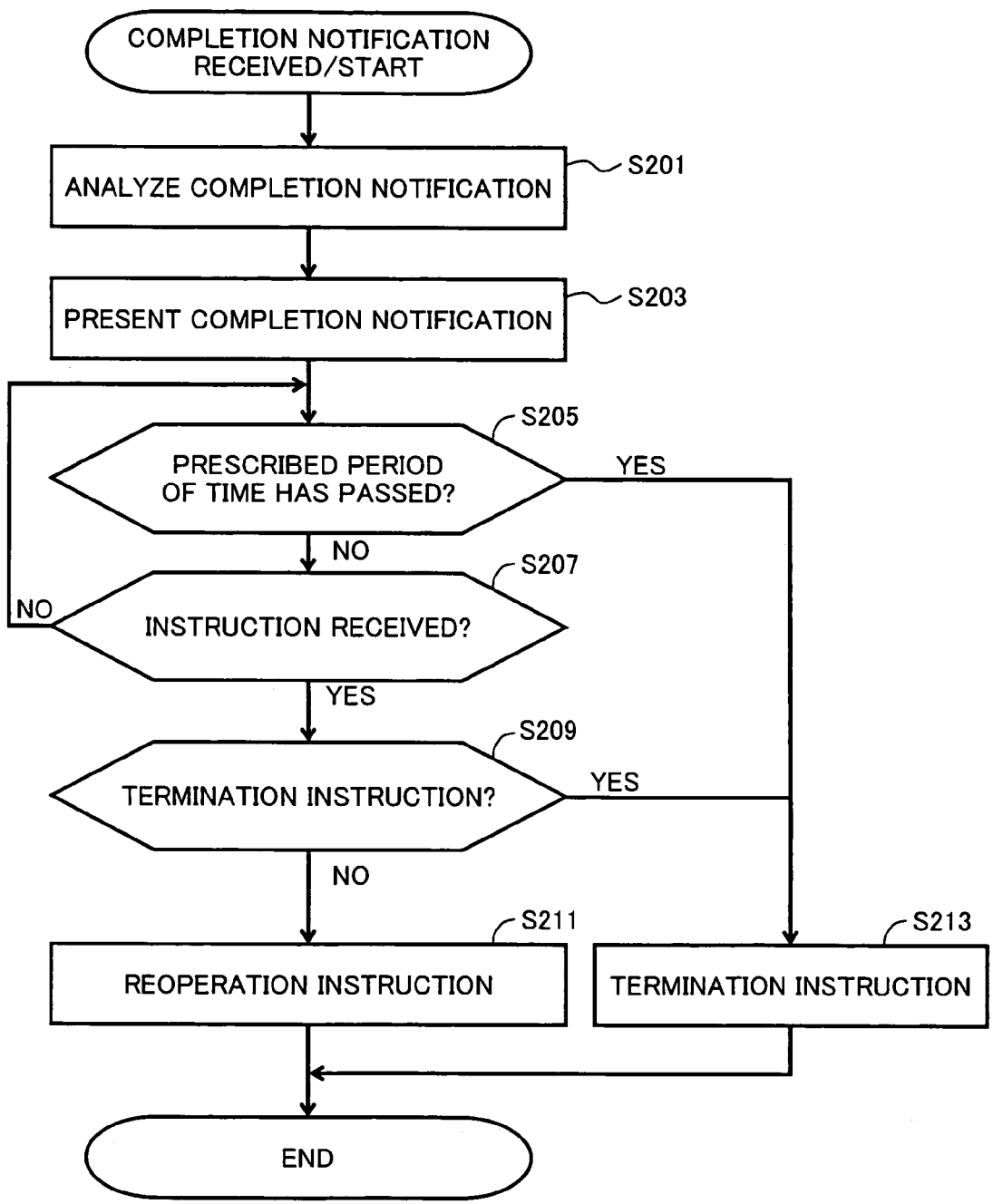
FIG. 7 is a flowchart illustrating a re-operation process performed in user PC 5.

The process shown in the flowchart in FIG. 7 is started in user PC 5 when a notification of completion of a printing operation is provided from image forming apparatus 1. The process is realized by CPU 51 of user PC 5 reading and executing the program stored in ROM 69 or the like.

Referring to FIG. 7, first, completion notification analysis unit 303 analyzes the completion notification (step S201). Furthermore, completion notification presentation unit 305 performs a process for displaying the completion notification on display 55, so that the completion notification appears on display 55 (step S203).

Then, when an instruction other than the instruction to terminate the operation is input from instruction input unit 307 based on the image appearing on the display (YES at step S207 and NO at S209), instruction output unit 309 instructs image forming apparatus 1 for reprocessing based on the instruction (step S211), and then a series of processes will end.

If the instruction to terminate the operation is input from instruction input unit 307 (YES at step S207 and YES at S209), or if no instruction is input for a prescribed period of time since the completion notification appeared on display 55 (YES at step S205), instruction output unit 309 instructs image forming apparatus 1 to terminate the operation (step S213), and then a series of processes will end.

[First Embodiment]

In an image forming system in accordance with a first embodiment, a re-operation process is performed to allow image forming apparatus 1 to perform the same operation as the previous operation.

Figure 8:
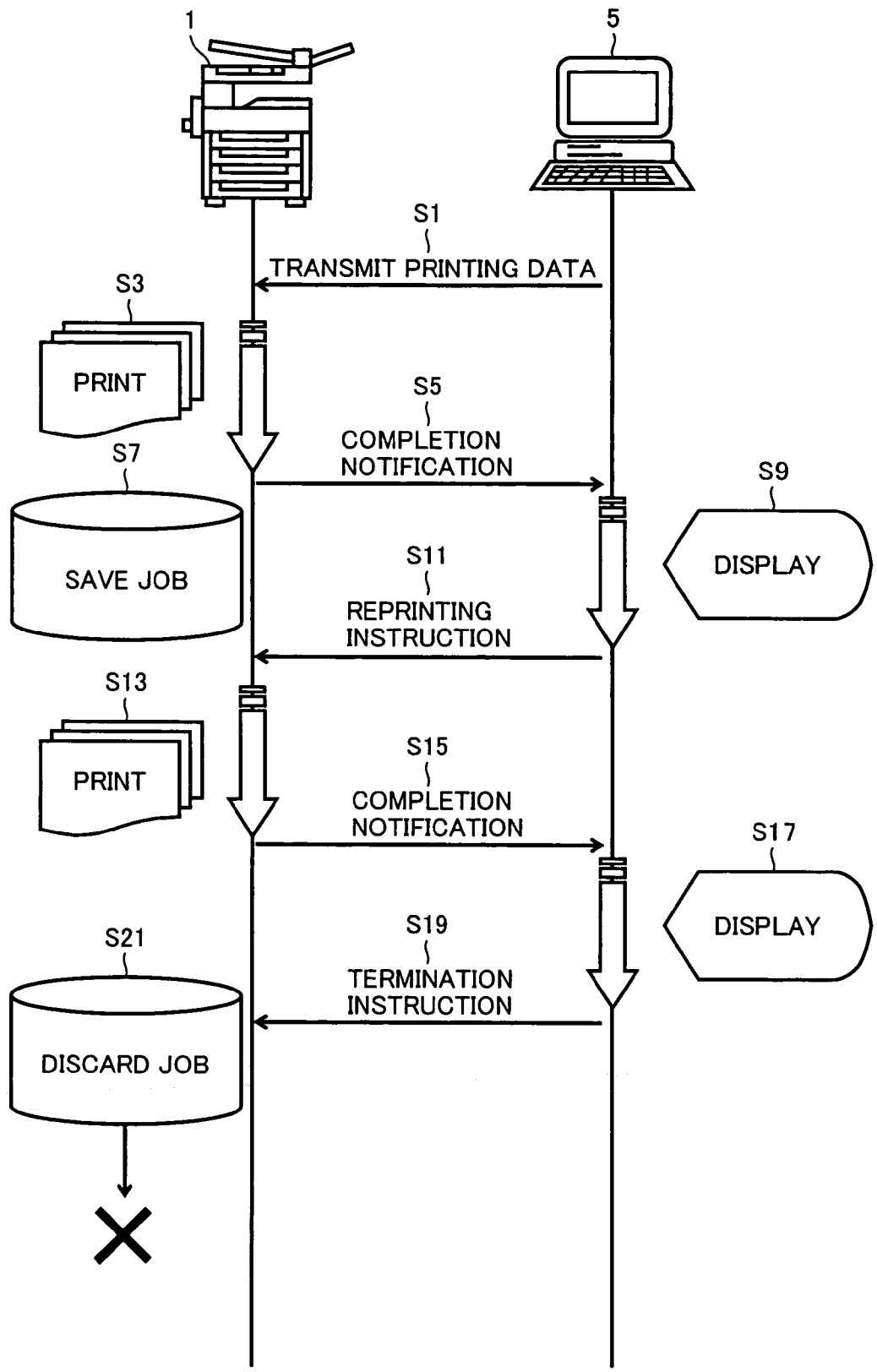
FIG. 8 shows a process flow in an image forming system in accordance with a first embodiment.

Referring to FIG. 8, first, printing data (printing job) having image data to be printed and printing conditions are transmitted from user PC 5 to image forming apparatus 1 (step S1). When printing is done in image forming apparatus 1 (step S3), image forming apparatus 1 performs the process at the above-noted step S105 to notify user PC 5 of completion of printing (step S5). In addition, the processes at the above-noted steps S101 and S103 are performed, so that the job is provided with an ID for saving and saved in job saving unit 105 (step S7).

Upon reception of completion notification at step S5, user PC 5 performs the process at the above-noted step S203, so that the screen appears on display 55 to give notification of completion of the process (step S9).

At step S9, a screen as shown in FIG. 9 appears on display 55 to give notification of completion of printing. As shown in FIG. 9, the screen includes a region for giving notification that the printing operation has been completed and a region containing a button for giving an instruction to complete printing and a button for giving an instruction for reprinting. User PC 5 receives an instruction to complete printing and/or an instruction for reprinting based on this screen.

It is noted that FIG. 9 shows an exemplary screen giving notification of completion of printing. The screen giving notification of completion of printing and giving an instruction for reprocessing is not limited to the screen shown in FIG. 9. For example, a region containing buttons for giving an instruction to complete printing and for giving an instruction for reprinting may not be included, and a prescribed operation such as pressing the next-screen button may be performed to switch to a screen including a region containing buttons for giving an instruction to complete printing and for giving an instruction for reprinting. Furthermore, the means for giving an instruction for reprinting as described above is not limited to a button and may be a screen showing an operation method for giving an instruction for reprinting, or the like. In addition, a printing result may be displayed in a preview on the screen giving notification of completion of printing, so that the printing result may be observed there.

When the button for giving an instruction for reprinting is pressed on that screen to give an instruction for reprinting, user PC 5 performs the process at the above-noted step S211 to instruct image forming apparatus 1 for reprinting (step S11). Image forming apparatus 1 receiving the instruction for reprinting performs the process according to the instruction at the above-noted step S115.

Figure 10:
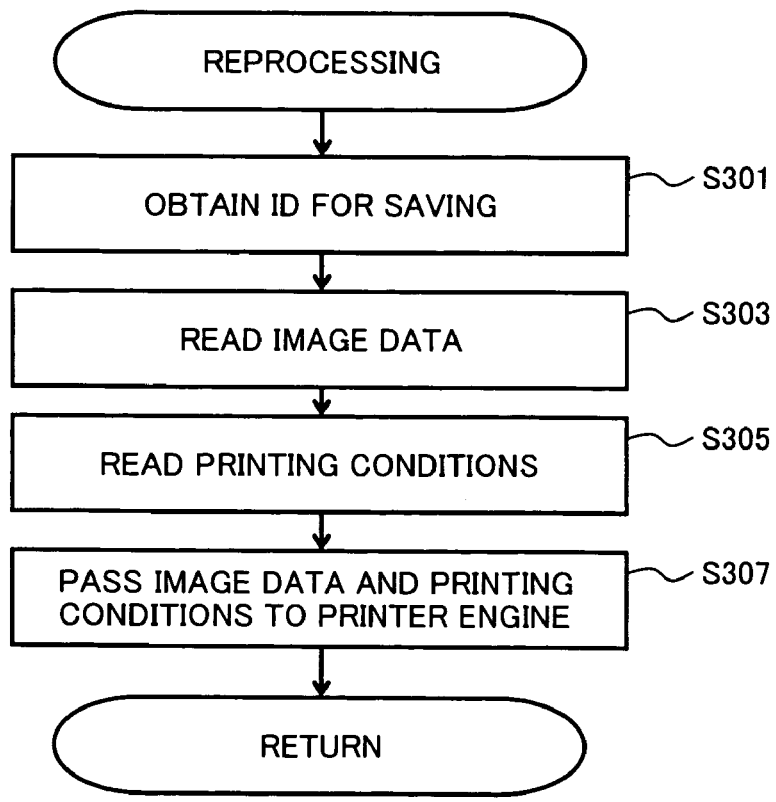
FIG. 10 is a flowchart illustrating the content of reprocessing performed at step S115 in image forming apparatus 1 in accordance with the first embodiment.

Specifically, referring to FIG. 10, upon reception of an instruction for reprinting from user PC 5, job management unit 103 of image forming apparatus 1 obtains an ID specifying a job to be subjected to reprocessing from the instruction (step S301) and reads image data included in the job specified the ID and the printing conditions stored in association with the image data in that job, from job saving unit 105 (steps S303, S305). Then, the image data and the printing conditions are passed to a printer engine for allowing printer unit 21 to perform a printing operation (step S307).

The processes as described above are performed in image forming apparatus 1, so that, according to the reprinting instruction received from user PC 5 at step S11, the same printing data (image data) is printed under the conditions similar to those of the printing at the above-noted step S3 (step S13) and user PC 5 is notified of completion of printing similar to step S5 (step S15).

When an instruction for termination is given by pressing the button for giving an instruction to complete printing on the screen giving notification of completion of printing, user PC 5 performs the process at the above-noted step S213 to instruct image forming apparatus 1 to terminate printing (step S19). Image forming apparatus 1 receiving the instruction to terminate printing performs the process at step S117 to discard the job saved in job saving unit 105 at step S7 (step S21).

The processes as described above are performed in the image forming system in accordance with the first embodiment, so that the user allows the image forming apparatus to perform the same operation again, with an easy operation, after an operation such as printing.

[Second Embodiment]

In an image forming system in accordance with a second embodiment, a re-operation process is performed to allow image forming apparatus 1 to perform the same operation with a setting different from that of the previous operation.

Figure 11:
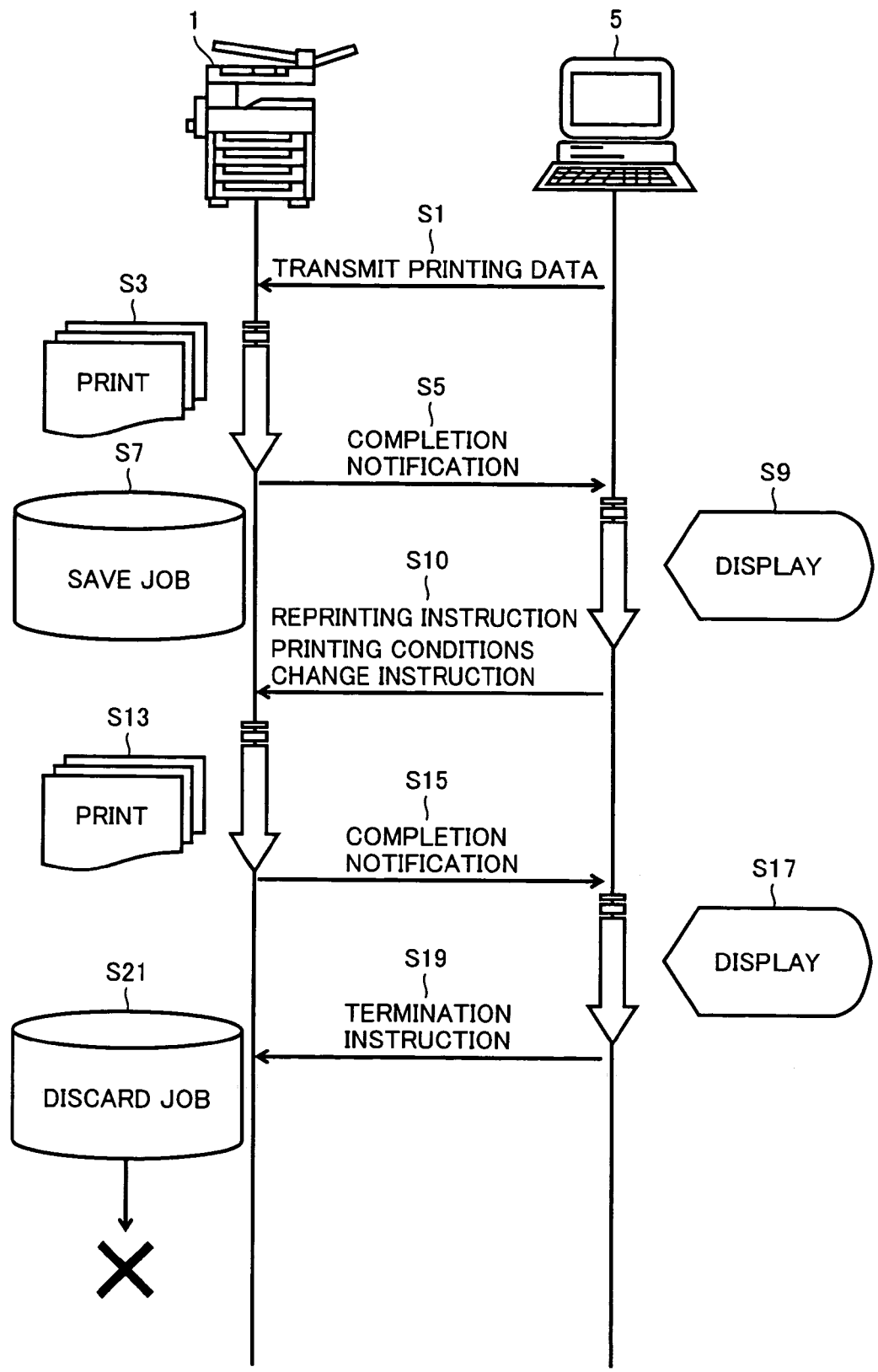
FIG. 11 shows a process flow in an image forming system in accordance with a second embodiment.

Referring to FIG. 11, first, user PC 5 transmits printing data (printing job) having image data and printing conditions to image forming apparatus 1 (step S1). Upon execution of printing (step S3), image forming apparatus 1 performs the process at the above-noted step S105 to notify user PC 5 of completion of printing (step S5). In addition, the processes at the above-noted steps S101, S103 are performed, so that the job is provided with an ID for saving and saved in job saving unit 105 (step S7).

Upon reception of the completion notification at step S5, user PC 5 performs the process at the above-noted step S203, so that the screen appears on display 55 to give notification of completion (step S9).

Figure 12:
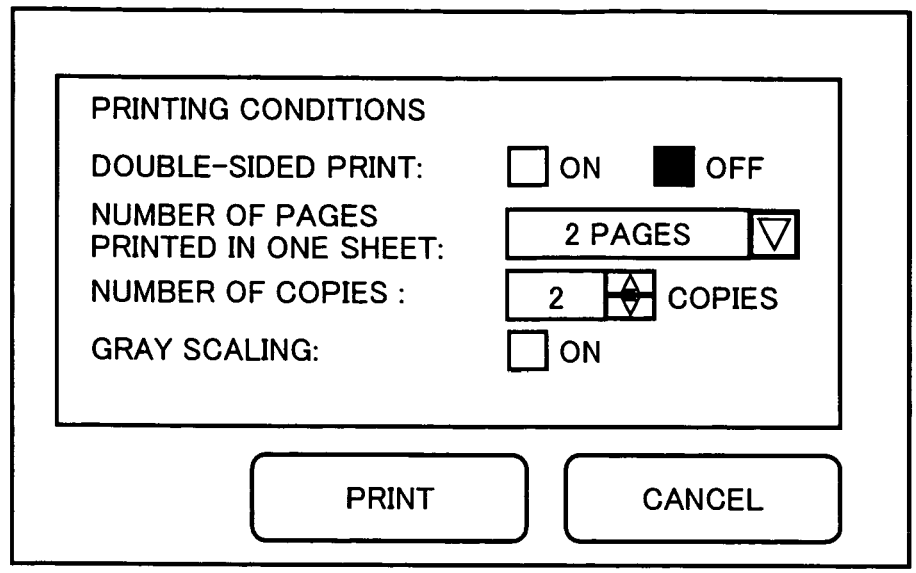
FIG. 12 shows an illustrative example of a screen for changing print settings.

The screen appearing at step S9 is similar to that shown in FIG. 9 above. However, in the image forming system in accordance with the second embodiment, when the button for giving an instruction for reprinting is pressed on the screen shown in FIG. 9, a screen for changing printing conditions from those in the previous printing appears as shown in FIG. 12. Specifically, the changeable printing conditions include, as shown in FIG. 12, double-sided printing or single-sided printing, the number of pages that are printed in one sheet of printing paper (the so-called N-in-1 setting), the number of copies, color printing or gray scale printing, and the like. Additionally, a change may be made on a finishing process or the like.

It is noted that the changeable printing conditions may include all the printing conditions that can be set before transmission of printing data at the above-noted step S1. However, depending on the job actually saved at the above-noted step S7, a change may not be preferred in some cases, for example, when printing cannot be done under the changed printing conditions or when the quality of print is significantly degraded under the changed conditions such as changing to higher resolution. Therefore, the changeable printing conditions (in addition, the setting values thereof) are preferably limited. The changeable printing conditions may be determined on either side of image forming apparatus 1 or user PC 5. When the changeable printing conditions are determined on the side of image forming apparatus 1, image forming apparatus 1 transmits information indicating the changeable printing conditions together with the notification of completion of printing to user PC 5. Alternatively, image forming apparatus 1 transmits the aforementioned changeable information to user PC 5 when receiving from user PC 5 an instruction for reprinting given by pressing the button for giving an instruction for reprinting on the screen giving notification of printing completion.

When the instruction for reprinting is provided by pressing the button for giving an instruction for reprinting and in addition, a change in the printing conditions is input, user PC 5 performs the process at the above-noted step S211 to instruct image forming apparatus 1 to change the printing conditions and also to do reprinting (step S10). Image forming apparatus 1 receiving the instruction to change the printing conditions and the instruction for reprinting performs the process according to the instructions at the above-noted step S115.

Figure 13:
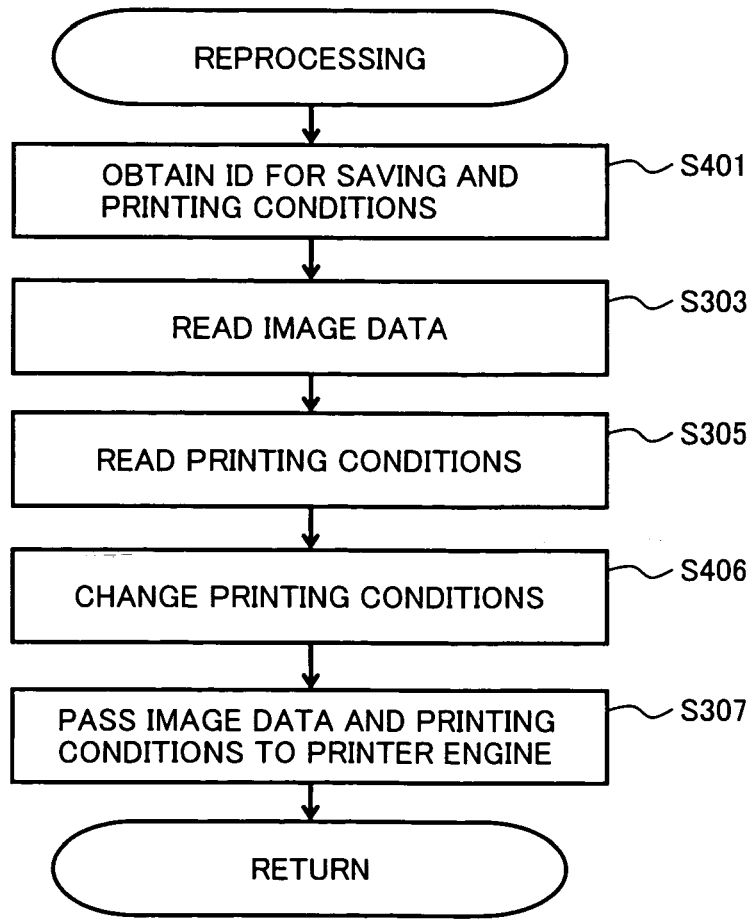
FIG. 13 is a flowchart illustrating the content of reprocessing performed at step S115 in image forming apparatus 1 in accordance with the second embodiment.

Specifically, referring to FIG. 13, upon reception of the instruction to change the printing conditions and the instruction for reprinting from user PC 5, job management unit 103 of image forming apparatus 1 obtains the ID specifying the job to be subjected to reprocessing and the changed printing conditions from the instruction (step S401), and reads the image data included in the job specified the ID and the printing conditions stored in association with the image data in that job from job saving unit 105 (steps S303, S305). Then, job management unit 103 changes the printing conditions based on the above-noted instruction (step S406) and passes the image data and the changed printing conditions to a printer engine for allowing printer unit 21 to perform a printing operation (step S307).

The processes as described above are performed in image forming apparatus 1, so that, according to the instruction for reprinting received from user PC 5 at step S11, the same printing data (image data) is printed under the printing conditions changed from the printing at the above-noted step S3 (step S13), and user PC 5 is notified of completion of printing similar to step S5 (step S15).

When the instruction for termination is provided by pressing the button for giving an instruction to complete printing on the screen giving notification of printing completion, user PC 5 performs the process at the above-noted step S213 to instruct image forming apparatus 1 to terminate printing (step S119). Image forming apparatus 1 receiving the instruction to terminate printing performs the process at the above-noted step S117 to discard the job saved in job saving unit 105 at step S7 (step S21).

The processes as described above are performed in the image forming system in accordance with the second embodiment, the user may allow the image forming apparatus to perform the same operation with the conditions changed from those of the previous operation, with a simple operation, after an operation such as printing.

[Third Embodiment]

In an image forming system in accordance with a third embodiment, a re-operation process is performed to allow image forming apparatus 1 to perform an operation different from the previous operation on the same image data as in the previous operation.

Figure 14:
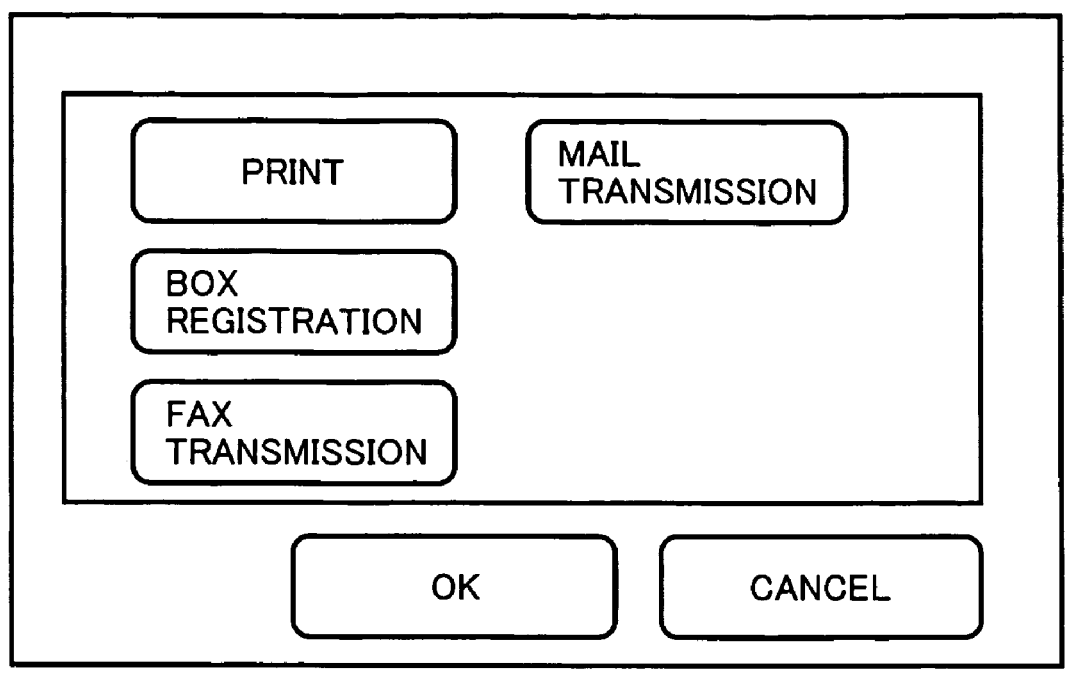
FIG. 14 shows an illustrative example of a screen for changing an output form.

The process flow in the image forming system in accordance with the third embodiment is similar to that shown in FIG. 11. Here, when a prescribed operation is performed, such as pressing a button for giving an instruction to change an output form, on the screen shown in FIG. 9 appearing at the above-noted step S9, at step S9, a screen for changing the output form in the previous printing to a different output form appears on display 55 as shown in FIG. 14. Specifically, the output form other than printing that can be changed includes a BOX output of saving an output in a dedicated storage region that is called a box provided at user PC 5, a server and the like, facsimile transmission, mail transmission, and the like.

When the button for giving an instruction about an output form is pressed on the screen for changing an output form, an additional screen for giving an instruction about the output conditions in that output form appears. The output conditions include a transmission or saving destination, the number of outputs, an output data type, a condition according to the output form (for example, resolution), and the like. The screen has a configuration similar to the screen shown in FIG. 12. When a destination is set as the output condition, the following screens appear. If the output form is BOX output, a list of boxes in the image forming system is displayed as the destination choices to be selected. If the output form is facsimile transmission, a list of facsimile recipients registered on the image forming system is displayed as the destination choices to be selected. If the output form is mail transmission, a list of mail addresses registered on the image forming system is displayed as the destination choices to be selected. It is noted that, needless to say, these screens may receive an input of an output condition to be set without receiving a selection from the choices displayed as the output conditions that can be set.

It is noted that the screen for changing the output form may be displayed in image forming apparatus 1 in accordance with the second embodiment and the process described above may be performed similarly by selecting printing on the screen.

When the output form is changed on the screen giving notification of printing completion, at the above-noted step S10, user PC 5 instructs image forming apparatus 1 to re-output in the changed output form, so that image forming apparatus 1 performs reprocessing at step S115.

Figure 15:
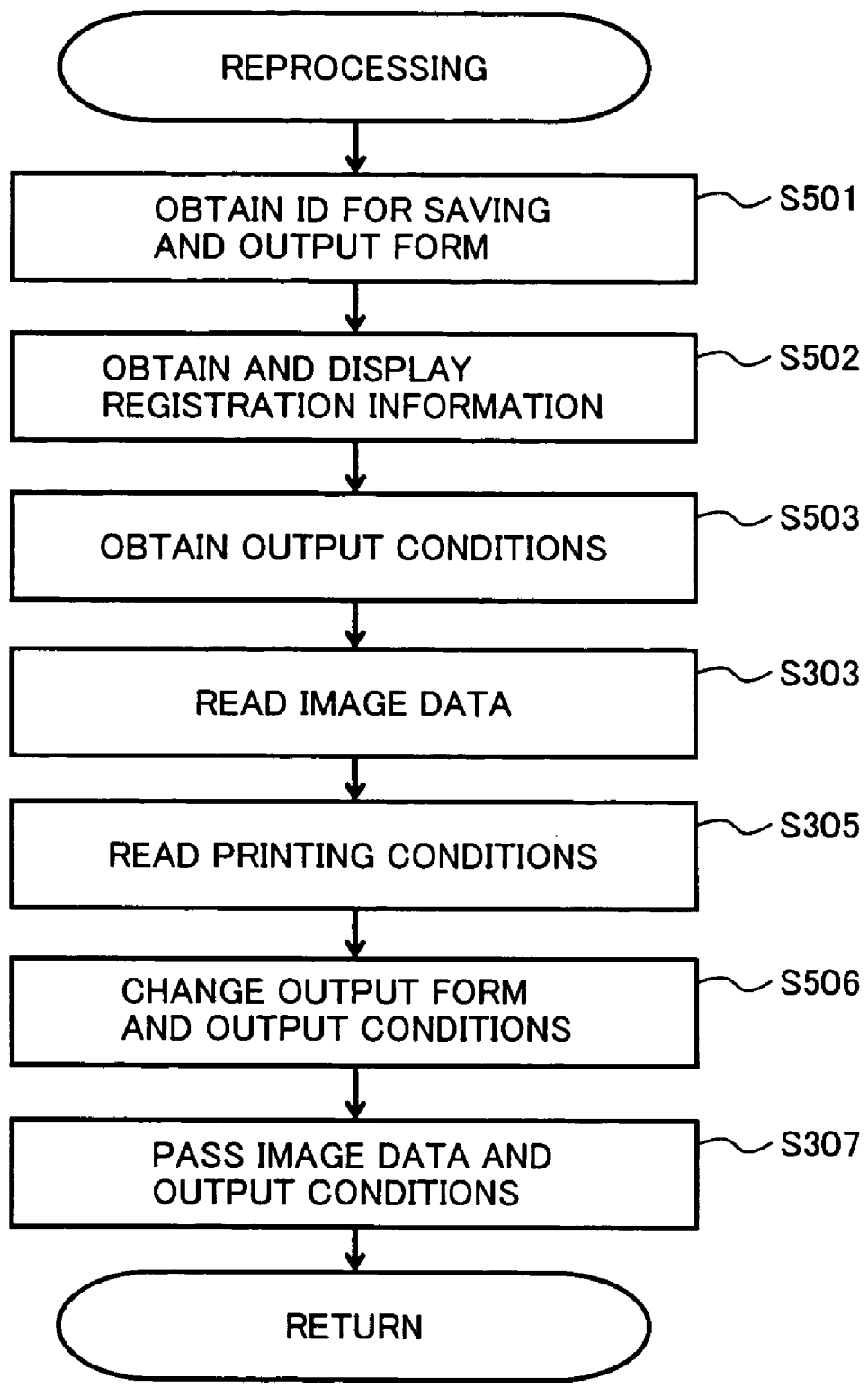
FIG. 15 is a flowchart illustrating the content of reprocessing performed at step S115 in image forming apparatus 1 in accordance with a third embodiment.

Specifically, referring to FIG. 15, upon reception of the instruction to change the output form from user PC 5, job management unit 103 of image forming apparatus 1 obtains an ID specifying the job to be subjected to reprocessing and the changed output form from the instruction (step S501). In addition, job management unit 103 obtains registered information of the destination in the output form based on the instruction, for example, the registered BOX information if the output form is BOX output, or the registered facsimile recipient information if the output form is facsimile transmission. Then, job management unit 103 outputs the information to user PC 5 to cause the aforementioned screen to appear to present the destination choices (step S502). Here, the registered information may be obtained from user PC 5, memory unit 13 of image forming apparatus 1, a server included in the image forming system, or any other device. Furthermore, if the registered information is obtained from user PC 5 itself or image forming apparatus 1 or any other device included in the image forming system by a program executed in user PC 5, the process at step S502 may not be performed in image forming apparatus 1.

Based on the information output at step S502, user PC 5 displays a screen for changing the output conditions as described above. When the output conditions are obtained from user PC 5 based on the screen (step S503), job management unit 103 of image forming apparatus 1 reads image data included in the job specified the above-noted ID and the printing conditions stored in association with image data in the job from job saving unit 105 (steps S303, S305). Then, job management unit 103 changes the output form in the job condition included in the job and the output conditions in that output form, based on the output form and the output conditions in the re-output that are obtained from user PC 5 at steps S501, S503 (step S506), and passes the image data and the output conditions to the function required for output in the output form (step S307).

The processes as described above are performed in image forming apparatus 1, so that, according to the instruction received from user PC 5 at step S11, the same printing data (image data) is output in the output form different from that of the printing at the above-noted step S3 and user PC 5 is notified of the completion of the output.

The processes as described above are performed in the image forming system in accordance with the third embodiment, so that the user may allow the image forming apparatus to perform an operation of outputting image data used in the previous operation in a different output form, with a simple operation, after an operation such as printing.

[Modification]

In the first to third embodiments as described above, an instruction for reprocessing to image forming apparatus 1 is transmitted from user PC 5. However, an instruction for re-operation may be provided for the job sent from user PC 5 on panel 17 of image forming apparatus 1.

Figure 16:
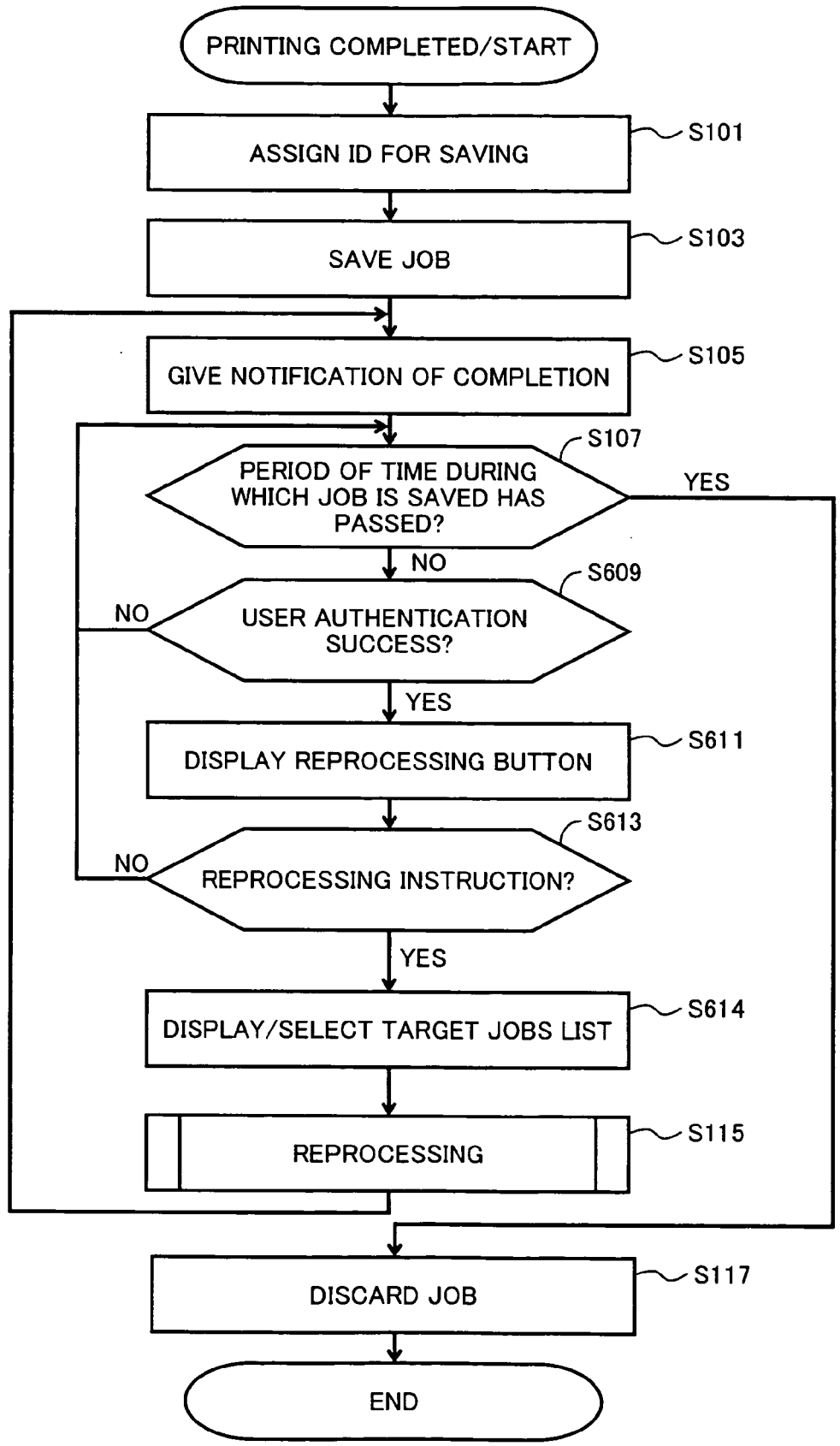
FIG. 16 is a flowchart illustrating a re-operation process performed in image forming apparatus 1 in accordance with a modification.

The process illustrated in the flowchart of FIG. 16 is also started in image forming apparatus 1 upon completion of an image forming operation (here, specifically, a print processing operation) in image forming apparatus 1 and is realized by CPU 11 of image forming apparatus 1 reading and executing the program stored in memory unit 13.

Referring to FIG. 16, in the modification, after notifying user PC 5 of completion of printing together with the ID for saving of a job, image forming apparatus 1 receives a log-in input on a log-in screen shown in FIG. 17 appearing on panel 17. When the not-shown authentication function of image forming apparatus 1 authenticates that the log-in user is the executor of the job saved in job saving unit 105 at step S103 or the user authorized for the operation on the job (YES at step S609), a button for giving an instruction for reprocessing is displayed on the basic screen appearing on panel 17 (step S611). FIG. 18 shows an illustrative example of the basic screen with the button for giving an instruction for reprocessing (the reprocessing job button).

It is noted that generally, in the initial state, the log-in screen appears on panel 17 in image forming apparatus 1 that performs user authentication. When log-in information including the user name and password is input on the screen, the authentication function performs user authentication. Upon user authentication, the basic screen appears on panel 17. Since image forming apparatus is MFP in the present embodiment, the basic screen in this embodiment corresponds to the screen for making the copy condition setting, as shown in FIG. 18. Image forming apparatus 1 in accordance with the present embodiment displays the reprocessing job button on the basic screen if a job is received from PC 5 and is saved in job saving unit 105. If no job is received from PC 5 or if a job saved in job saving unit 105 is discarded at the above-noted step S117 based on the determination that a prescribed period of time has passed at the above-noted step S107, the reprocessing job button is not displayed on this basic screen even if the user is authenticated by the authentication function.

When job management unit 103 detects that this button is pressed (YES at step S613), it searches job saving unit 105 using the log-in information to extract the job which the user is authorized to operate based on the user information included in the job condition. Then, a screen as shown in FIG. 19 appears on panel 17, which shows a job list indicating a list of jobs that can be reprocessed and receives a selection from the user (step S614).

It is noted that if there is only one job that is issued by the authenticated user or that the user is authorized to operate, the above-noted step S614 is skipped, and the process of displaying the job list screen as shown in FIG. 19 and receiving a selection may not be performed.

Thereafter, the similar process as in the reprocessing (step S115) in accordance with the first to third embodiments as described above is performed on the selected job, so that the image data included in the job is re-output.

Specifically, as in the first embodiment, if printing is done, as re-output of image data, only with the same printing conditions with the completed job, the screen for presenting or selecting a reprintable job and giving an instruction for reprocessing appears as shown in FIG. 9. The user presses the reprinting button on the screen, so that the reprocessing (re-printing) is performed under the same condition.

Furthermore, as in the second embodiment, if image data included in a job can be reprinted, as re-output of image data, under the printing conditions different from those of the job of which printing has been completed, the screen for presenting or selecting reprintable jobs appears as shown in FIG. 9 to allow a target job to be selected, and thereafter, the screen for setting printing conditions additionally appears as shown in FIG. 12. The user sets the printing conditions and presses the print button on the screen, so that the reprocessing (reprinting) is performed under the changed printing conditions.

In addition, as in the third embodiment, if image data included in a job can be output, as re-output of image data, in a different operation by executing a job of a kind different from that of the job of which execution has been completed (different operation), the screen for presenting or selecting reprintable jobs appears as shown in FIG. 9 to allow a target job to be selected, and thereafter the screen for setting an output form appears as shown in FIG. 14 to allow an output form to be set. Thereafter, the additional screen for setting the output conditions in that output form appears. The user sets the output conditions and performs an operation of giving an output instruction by pressing the output button on the screen, so that an output is made in the changed operation (reprocessing).

Also in this modification, similar to the first to third embodiments as described above, image forming apparatus 1 may execute a second job as another job while waiting for an instruction for reprocessing on the first job saved in job saving unit 105. The second job corresponds to the job transmitted from PC of the second user other than the authenticated first user described above, the job (such as copy) issued by the second user who logged in image forming apparatus 1, or the like. Specifically, in this modification, the period of waiting for an instruction for reprocessing corresponds to the loop period at steps S107 to S613 in FIG. 16. In this period, image forming apparatus 1 can perform concurrent processing of waiting for an instruction for reprocessing on the first job and the execution of the second job as described above.

The processes as described above are performed in the image forming system in accordance with the modification, so that the user may allow the image forming apparatus to perform reprocessing on the image data used in the previous operation even from the image forming apparatus, with a simple operation, after an operation such as printing.

Furthermore, the image processing method performed in the image forming system as described above may be provided as an image processing program. Such a program may be recorded on a computer readable recording medium such as a flexible disk, CD-ROM, ROM, RAM, and memory card attached to a computer and provided as a program product. Alternatively, the program may be provided such that it is recorded on a recording medium such as a hard disk contained in a computer. Alternatively, the program may be provided by being downloaded via a network.

It is noted that the image processing program in accordance with the present invention may call a necessary module, of the program modules provided as a part of an operation system (OS) of a computer, in a prescribed array at a prescribed timing in order to perform image processing. In such a case, the aforementioned modules are not included in the program itself and the image processing is performed in cooperation with OS. Such a program that does not include modules may also be included in the image processing program in accordance with the present invention.

Alternatively, the program may be provided such that it is built in a part of another program. In such a case, the modules included in another program are also not included in the program itself, and the image processing is performed in cooperation with another program. Such a program built in another program may also be included in the image processing program in accordance with the present invention.

The provided program product is installed in a program storing unit such as a hard disk for execution. It is noted that the program product includes the program itself and the recording medium having the program recorded thereon.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
    an output unit outputting first image data according to a first job;
    a holding unit holding said first image data even after completion of said first job; and
    a transmission unit transmitting data to an information processing apparatus giving notification of completion of said first job, together with data for inputting an instruction at the information processing apparatus to re-output said first image data in response to completion of an output according to said first job.

2. The image forming apparatus according to claim 1, further comprising an instruction input unit inputting an instruction to re-output said first image data, wherein said output unit re-outputs said first image data held by said holding unit, in response to said instruction.

3. The image forming apparatus according to claim 2, wherein if a process of outputting second image data is being performed when said instruction is received, said output unit generates an interruption in the process of outputting said second image data to perform a process for re-outputting said first image data.

4. The image forming apparatus according to claim 2, wherein if a process of outputting second image data is being performed when said instruction is received, said output unit performs a process for re-outputting said first image data after termination of the process of outputting said second image data.

5. The image forming apparatus according to claim 2, wherein if a process of outputting second image data is waiting as a process to be performed when said instruction is received, said output unit performs a process for re-outputting said first image data after termination of the process of re-outputting said second image data.

6. The image forming apparatus according to claim 2, wherein said instruction input unit also inputs an instruction about a timing at which a process for re-outputting said first image data is performed, together with said instruction to re-output.

7. The image forming apparatus according to claim 2, wherein said instruction input unit is an operation unit provided for said image forming apparatus.

8. The image forming apparatus according to claim 7, wherein
said holding unit holds said first image data together with information about a user who gives an instruction for said output,
said image forming apparatus further comprising:
an authentication unit performing user authentication based on log-in information input by said operation unit; and
a presentation unit presenting a list of image data held in said holding unit together with information about an authenticated user and/or instruction means for presenting said list and giving and instruction to re-output said image data.

9. The image forming apparatus according to claim 1, further comprising a management unit deleting said first image data held in said holding unit after a prescribed period of time has passed.

10. The image forming apparatus according to claim 1, wherein said holding unit holds said first image data even after a process of outputting second image data is performed after said first image data is output.

11. The image forming apparatus according to claim 1, wherein
said holding unit assigns identification information to said first image data, and
said transmission unit additionally gives notification of said identification information,
said image forming apparatus further comprising a reception unit receiving an instruction to re-output said first image data using said identification information from said information processing apparatus, wherein
said output unit re-outputs said first image data corresponding to said identification information included in said instruction received by said reception unit.

12. The image forming apparatus according to claim 1, wherein said transmission unit additionally transmits to said information processing apparatus an output condition that can be set at a time of re-outputting.

13. An image forming apparatus comprising:
an output unit outputting first image data received from an information processing apparatus according to a first job;
a transmission unit, upon completion of an output according to said first job, giving notification of completion of said output;
a holding unit holding said first image data;
a display unit displaying a screen for giving an instruction to re-output said first image data held in said holding unit; and
an operation unit giving an instruction to re-output said first image data;
wherein if said holding unit holds said first image data and second image data as image data of which output has been completed by said output unit, said display unit displays a list of said first image data and said second image data on said screen.

14. The image forming apparatus according to claim 13, further comprising an authentication unit performing user authentication based on log-in information input by said operation unit, wherein said display unit displays said screen after said user authentication.

15. An information processing apparatus comprising:
a reception unit receiving, from an image forming apparatus that has output image data according to a job, data giving notification of completion of said job that is transmitted, in response to the completion of said job at the image forming apparatus, together with data for inputting an instruction at the information processing apparatus to re-output said image data;
a display unit displaying said notification data and said instruction input data received by said reception unit on a screen; and
an instruction unit transmitting an instruction to said image forming apparatus to re-output said image data in response to an input according to the instruction input data displayed on said screen.

16. The information processing apparatus according to claim 15, wherein said instruction unit gives an instruction about an output condition different from an output condition in said output of said image data, as an output condition for re-outputting said image data.

17. The information processing apparatus according to claim 15, wherein said instruction unit additionally instructs said image forming apparatus about a timing at which a process for re-outputting said image data is performed, together with said re-outputting.

18. The information processing apparatus according to claim 15, wherein said reception unit receives information about an output condition that can be set at a time of re-outputting from said image forming apparatus,
said information processing apparatus further comprising a presentation unit presenting said information, wherein
said instruction unit gives an instruction about an output condition at a time of re-outputting of said image data based on presented said information.

19. A non-transitory computer readable storage medium that stores an image processing program that causes a computer to perform image processing including the steps of:
outputting image data according to a job;
performing a process for holding said image data even after completion of said job;
transmitting data to an information processing apparatus giving notification of completion of said job, together with data for inputting an instruction at the information processing apparatus to re-output said image data in response to completion of an output according to said job;
detecting an instruction to re-output said image data; and
re-outputting said held image data, upon detection of said instruction to re-output said image data.

20. An image processing method comprising the steps of:
outputting image data according to a job in an image forming apparatus;
transmitting data to an information processing apparatus that has given an instruction to output said image data from said image forming apparatus giving notification of completion of said job, together with data for inputting an instruction at the information processing apparatus to re-output said image data in response to completion of an output according to said job;

storing said image data in a holding unit even after completion of said job in said image forming apparatus;

giving an instruction from said information processing apparatus to said image forming apparatus to re-output said image data, according to a screen displaying data giving notification of completion of said job and data for giving an instruction to re-output said image data; and re-outputting said image data according to said instruction in said image forming apparatus.

* * * * *